United States Patent Office 2,764,038
Patented Sept. 25, 1956

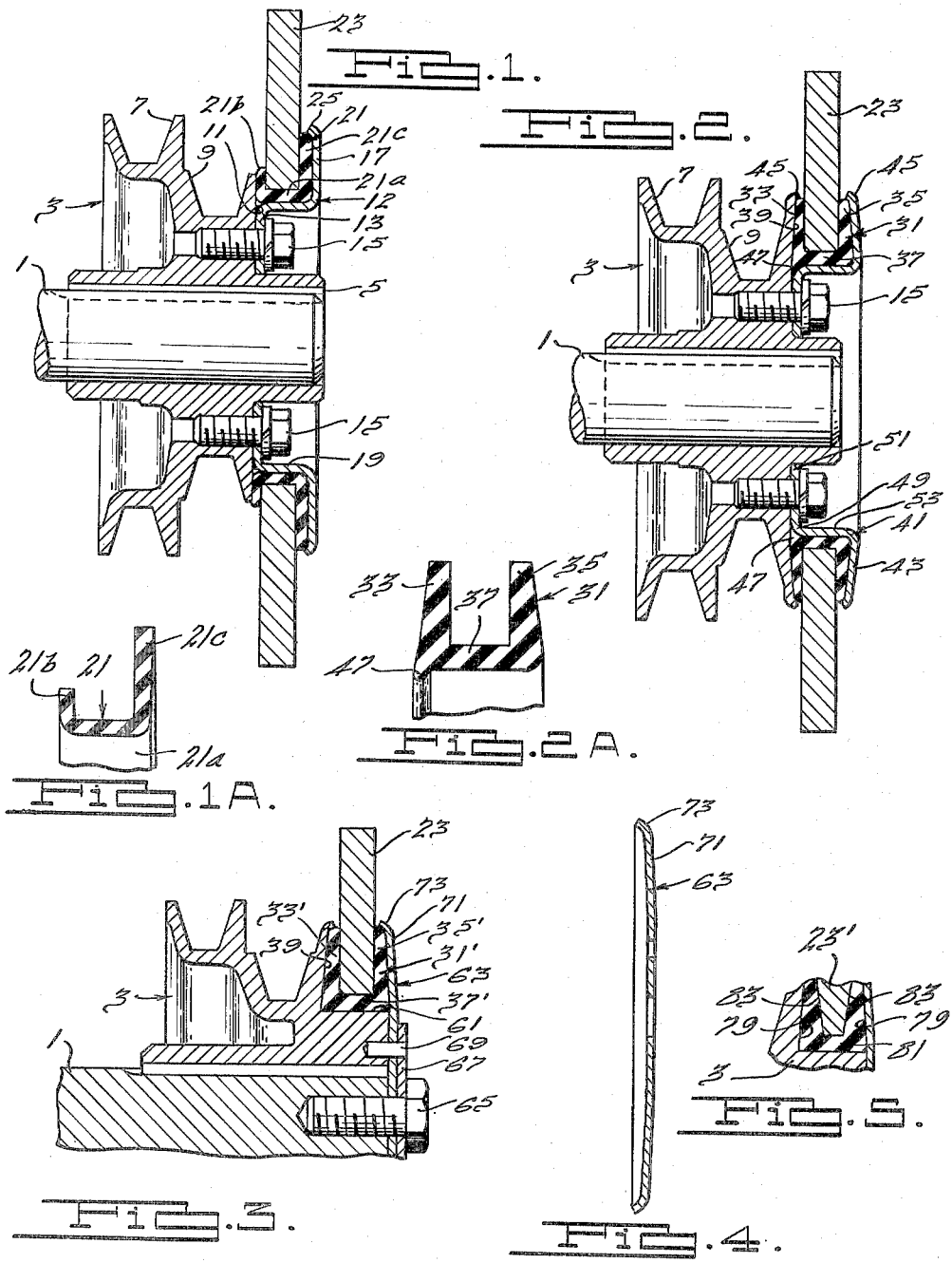

2,764,038

VIBRATION DAMPER

Thomas H. Peirce, Detroit, and James B. Robinson, Huntington Woods, Mich., assignors, by mesne assignments, to Thomas H. Peirce, Detroit, Mich., doing business as H. A. King Company Application February 3, 1951, Serial No. 209,279

14 Claims. (Cl. 74—574)

This invention relates to torsional vibration dampers such as are employed on the crank shafts of internal combustion engines and, in particular, refers to the type of torsional vibration damper wherein a freely oscillatory inertia mass is connected to the vibrating shaft through a mass of rubber, the term "rubber" including natural and synthetic forms as well as equivalent materials.

As is well known, at certain speeds the forced frequency of vibration imposed on a crank shaft by the explosive forces on the pistons approaches the natural frequency of vibration of the shaft so that a resonant condition and excessive amplitudes of torsional vibration are created. These vibrations are so excessive that in the absence of a suitable damper they will quickly destroy the crank shaft or other parts of the engine. An ideal damper would completely eliminate any torsional vibration at any speed of the engine, its life would be as long as that of the engine, and its cost of manufacture would be reasonably low.

It is the object and the achievement of the present invention to provide a rubber type torsional vibration damper which approaches more closely to the ideal damper than dampers heretofore known.

The rubber type damper, because of its inherent simplicity of design, is well adapted to low cost mass manufacture and the present invention partakes of this advantage and also adds certain structural features which enable a further reduction in the cost of manufacture to be realized. Though the rubber type damper is relatively inexpensive to produce, its durability and life have been limited and, in many cases, its ability to eliminate substantial torsional vibrations at the critical speeds has not been too satisfactory. Actual tests have shown conclusively that the present damper has an exceedingly long life and good durability as well as a much superior effectiveness in damping torsional vibrations throughout the entire range of speeds as compared with known type rubber dampers.

Inasmuch as a theoretical analysis of all the factors present in a torsional vibration system that is damped by a rubber type damper is rather complex and uncertain at best, the precise reasons why the present damper provides such improved operation are not fully understood at the present time. However, the improved results are associated with the combination of two novel features of rubber damper construction. First, the rubber mass, which is annular in shape and surrounds the vibrating shaft, is used in a state of radial compression which is preferably secured by enlarging the inner diameter of the rubber mass in the assembled state. A second novel feature, which when combined with the first results in a damper giving unusually fine performance, resides in the use of a chamber of gradually reduced cross sectional area in the direction of increasing radius from the axis of rotation to confine the rubber in initial assembly and resist its outward radial flow under the influence of centrifugal force.

As a result of these features of construction, the present invention is able to employ rubber of greater hardness and thus of greater hysteresis. Nevertheless, the flexibility of the rubber is very good and, in fact, dampers of the present construction have a frequency which ordinarily is only 30% to about 60% engine frequency; whereas the empirical frequency to which rubber dampers have always heretofore been tuned is 65% to 85% of the engine frequency. The increased hardness of the rubber also improves its radial load carrying characteristics and its durability and is believed to be at least partially responsible for the marked increase in the life of the present dampers. Also, the increased hardness permits the use of better quality rubber, e. g., rubber having no petroleum additions for softening purposes.

The invention is shown by way of illustration and not of limitation in the accompanying drawings, wherein:

Figure 1 is an axial section through a rubber type torsional vibration damper embodying the present invention;

Fig. 1a is a cross section through the rubber member of Fig. 1;

Fig. 2 is an axial section through a modified form of rubber type torsional vibration damper embodying the invention;

Fig. 2a is a cross section through the rubber member of Fig. 2;

Fig. 3 is a partial axial section through a modified form of rubber torsional vibration damper embodying the present invention;

Fig. 4 is a cross section through the clamping plate used in the damper of Fig. 3; and Fig. 5 is a cross section through a part of a damper illustrating another modified form of the invention.

The shaft 1 shown in the various figures is assumed to be subject to torsional vibration which it is desired to eliminate by means of a damper mounted thereon. In automobile engines, the forward end of the crank shaft has the maximum amplitude of vibration and thus serves as the optimum location for the damper. Inasmuch as the forward end of the crank shaft serves also as a power take-off location for driving the fan and generator, it is customary to combine the damper and pulley structure and mount the resulting construction on the forward end of the crank shaft. Such a combined pulley and damper structure is shown in Figs. 1–3.

Referring first to the modification of the invention illustrated in Fig. 1, it includes a hub 3 that is mounted on the end of the shaft 1 and keyed at 5 to the shaft for rotation and torsional vibration with it. The hub 3 is illustrated with two pulley grooves 7 and 9 which may receive suitable pulley belts (not shown) for driving the fan, generator, or the like. The hub 3 has a radial surface 11 which is situated inwardly from the end of the hub. A stamped metal retainer 12 has a radial inwardly directed flange 13 which engages the face of the radial hub surface 11 and is clamped against it by the screws 15. The retainer 12 has another radial flange 17 which extends outwardly. This flange is spaced forwardly of the flange 13 and connected integrally with the flange 13 by an annular section 19 that is concentric with the axis of the hub 3 and the shaft 1. A J-shaped annular rubber body 21 is mounted on the outer diameter of the annular retainer section 19 in such a manner that its base 21a engages the retainer section 19 and the outer sides of its legs 21b and 21c engage the radial surface 11 on the hub 3 and the radial retainer flange 17. Preferably, the long leg 21c of the J-shaped insert 21 engages the flange 17 and the short leg 21b engages the radial surface 11.

Mounted on the outer diameter of the base of the rubber body 21 is an annular inertia member 23 which is preferably in the form of a flat disk or ring. The opposite radial faces of the inertia member 23 engages the inside faces of the legs in the J-shaped rubber body 21, the disk being of a substantially greater outer diameter, however, than the rubber body 21 as clearly shown in the drawings. Relative annular movement between the inertia member 23 and the rubber body 21 and also relative movement between the rubber body 21 and the retainer 17 and radial surface 11 is prevented by friction between the rubber and the surfaces which it engages rather than by surface bonding. The necessary friction to accomplish this is obtained by axial forces applied to the rubber when the retainer 12 is clamped against the radial surface 11. The width of the J-shaped rubber body 21 is greater than the clearance between the inside of the flange 17 and the radial face 11, this excess width consisting largely in an increased thickness of the legs of the J-shaped section in the free state as compared with the clearance remaining between the faces of the disk 23 and the radial surface 11 and the flange 17. Thus, clamping of the retainer 12 to the hub 3 squeezes the rubber tightly between the opposing faces of the disk and hub and retainer flange 17 so that outward radial flow of rubber in the legs of the rubber body 21 occurs as well as axial compression of the annular base of the rubber body. If desired, the outward flow of the rubber in the stem of the J-shaped section may be limited by an inwardly directed radius 25 formed on the edge of the retainer flange 17. The natural resiliency of the flange 17 tends to take up "set" of the rubber.

An important feature of the present invention resides in the relative diameters of the inner periphery of the disk 23, the outer periphery of the annular retainer section 19, and the inner and outer peripheries of the base 21a of the body 21. These are such that the thickness of the annular base 21a of the rubber body is less in the assembled condition than it is in the free state so that this section of the rubber body may be regarded as in a state of radial compression. Preferably, this is achieved by making the outer diameter of the annular rubber section 21a the same as the inner diameter of the disk 23 but making the inner diameter of the annular rubber section 21a smaller than the outer diameter of the annular retainer section 19. Consequently, in assembly the inner diameter of the annular rubber section will be enlarged while its outer diameter will remain substantially the same and the result is necessarily a reduction in the radial thickness of the rubber. The excess rubber flows axially in the annular section 21a and then radially into the radial legs 21b and 21c.

In the modification of Fig. 2, means are provided to furnish additional resistance to radial flow of the rubber along the legs 21b and 21c of the rubber body 21. As just indicated, this flow tends to occur because of radial compression of the base portion 21a of the rubber and, as is well known, it also occurs during operation of the damper due to centrifugal force. In the modification of Fig. 2, the rubber body 31 is of U-shape having inner and outer legs 33 and 35 and a base portion 37. The hub has a radial surface 39 that corresponds to the surface 11 and engages the outer surface of the leg 33 of the annular rubber body 31. A clamping disk 41 is substantially the same in construction as the plate 12, but its outer radial flange 43 is tapered slightly toward the surface 39 on the hub. Likewise, the hub surface 39 is tapered toward the flange 43. Incidentally, each of the surfaces 39 and 43 may be provided with inwardly directed radii 45 at their outermost edges to serve as bumpers for limiting radial flow of the rubber. The inertia member 23 is used in the damper of Fig. 2 and, since its side faces are perpendicular or truly radial with respect to the axis of the hub 3 and shaft 1, the spaces defined by its side faces and the surface 39 and flange 43 decrease in cross section with increasing radius. Therefore, as the rubber flows outwardly, it must crowd into sections of gradually reducing area and therefore the resistance to radial outward flow increases with the amount of such flow.

A further feature of the modification of Fig. 2 resides in the formation of a radial lip 47 on the rubber body 31 which extends inwardly from the base section 37 in the plane of the leg 33. The lip 47 fills a void that usually exists between the inner face of the disk 41 and the surface 33 due to the fact that the junction 49 between the inner flange 51 and the annular central section 53 of the disk 41 is ordinarily formed on a radius in the stamping operation.

Fig. 3 is a modification of the construction shown in Fig. 2 and shows a rubber body 31' which, like the body 31 of Fig. 2, has a central section 37' that is under radial compression in assembly and inner and outer legs 33' and 35' corresponding to the legs 33 and 35 of the rubber body shown in Fig. 2. In this modification, the hub 3 has the tapered radial surface 39 but is provided with an annular surface 61, preferably of slightly greater diameter than that of the inner periphery of rubber section 37' in the free state, on which the section 37' is seated. The axial compression forces for holding the rubber body 31' and the inertia member 23 in place are provided in this modification by a clamping plate 63 which lies completely in substantially a radial plane. The plate 63 is clamped to the end of the shaft 1 against the outer leg 35' of the rubber body by means of a bolt 65 which threads into the shaft and shoulders on a washer 67 engaging the outer face of the plate 63. Angular creeping of the plate 63 relative to the shaft 1 is prevented by dowels 69 extending through suitable holes in the plate 63 and the hub 3. The outer portion 71 of the plate 63 which engages the outer face of the rubber leg 35' is tapered inwardly in the same manner as the flange 43 of the disk 41. The peripheral edge 73 of the plate 63 may be turned in to provide a bumper corresponding to the bumper 45 previously mentioned in connection with Fig. 2. It is clear that with this shape, the plate 63 provides a spring effect to compensate for set of the elastic body 31'.

As already indicated, the annular rubber members 31 and 31' have central sections 37 and 37' with inside diameters that are preferably slightly less in the free state than the diameters of the surfaces on which they are seated in the assembled state whereby enlargement of the diameters occurs and consequently radial compression takes place. Also, it is preferred that the outside faces of the legs 33 and 33', and 35 and 35', be tapered substantially parallel to the surfaces 39, 43, and 71 which engage them, and that the inner faces of the legs of these rubber members be parallel to the faces of the disk 23 as shown in Fig. 2a. Consequently, in the preferred shape of the members 31 and 31', the legs will be of decreasing cross sectional area with increasing radius in the same manner as the chamber provided for the members by the disk 23 and the radial surfaces formed on the clamping plate and hub. Preferably, the inner and outer legs of the rubber members are of the same thickness as well as the same length. In the modification of Fig. 1 wherein no taper of the metal or non-elastic members is employed, it is desirable to form the leg 21c so that it is the converse of the leg shapes used in the members 31 and 31'. That is, the outer face of the leg 21c is tapered outwardly with increasing radius so that in the free state its thickness increases with the radius (Fig. 1a). The inner leg 21b may be of uniform thickness throughout its length and best results have been obtained when it is of slightly less thickness than the minimum thickness of the leg 21c. Obviously, a lip corresponding to lip 47 may be provided on the rubber member 21 of Fig. 1.

In the modification of Figs. 1–4, the inertia member 23 has been shown with side faces that are square with the axis of the bore of the hub 3. However, the desired taper may be provided in the manner shown in Fig. 5 by forming the outer radial restraining faces 79 for the rubber member 81 so that they are square with the axis of the damper and by tapering the side faces 83 of the inertia member 23' toward each other. This arrangement provides a restriction to outward radial flow in the same manner as the construction shown in Figs. 2–4. Obviously, the methods of Figs. 2–5 may be combined so that the taper is provided on both the inner and outer restraining faces in order to obtain the restriction to radial flow.

A damper of the type shown in Fig. 2 has been successful in completely suppressing 6th order, 1st mode vibrations at 2900 R. P. M. of 0.7 degree and 4½ order, 1st mode vibrations at 3800 R. P. M. of over 0.8 degree in a six-cylinder in line internal combustion engine similar to those used in passenger cars, this engine having a natural frequency of about 290 cycles per second. This damper was mounted on the end of the crankshaft remote from the flywheel in accordance with usual practice. The disk 23 was 7¾ inches O. D., 4.25 inches I. D., and ½ inch thick. Its WR² was 45.2 lbs. in.², about 15% of the crankshaft polar moment of inertia. The rubber member 31 had an O. D. of 5¾ inches and legs 33 and 35 were spaced ½ inch apart and tapered in thickness from 0.285 to 0.174 inch, the compressed thickness of the of the legs in assembling tapering from 0.156 to 0.250 inch. The rubber durometer was 60 and the deflection of the member 31 at 10" radius, 100 foot pounds, was 0.115 inch. The base 37 was ⅛ inch thick in the free state and its I. D. was 4 inches. The O. D. of the section 53 of retainer 41 was 4.046 inches. The frequency of the damper was 150 cycles per second, about 52% of the engine frequency. As indicated, this damper completely suppressed torsional vibrations in the engine indicated and had a further desirable characteristic in that it did not seem to drop the fundamental frequency of the system since no second mode vibrations were observed.

What is claimed is:

1. A tuned type rubber torsional vibration damper comprising a hub having an axial bore whereby it may be secured to a shaft subject to torsional vibrations, an inertia member surrounding said hub having axially spaced side faces and an inner periphery concentric with said bore and spaced radially outwardly from the hub and inwardly from the major portion of said faces, means providing radial surfaces rigid with said hub and spaced axially from said member faces, an annular rubber body having side legs engaging said faces and surfaces and each confined between a surface and a face, said rubber body having an annular section located between and radially inwardly of the major portion of said legs and confined between the hub and said inner periphery in a state of radial compression, said faces and surfaces being tapered toward each other with increasing radius whereby resistance to outward radial flow of the rubber body is provided by a decreasing cross sectional thickness of the space between a face and a surface.

2. The invention as set forth in claim 1 wherein said rubber body is in a state of axial compression.

3. A rubber torsional vibration damper comprising hub means adapted to be mounted on a shaft subject to torsional vibration, said hub means including an annular surface concentric with the axis of a shaft upon which said means may be mounted, said hub means including axially spaced radial surfaces extending radially outwardly from said annular surface, an annular rubber body having a central annular portion seated on said annular surface and radially outwardly extending axially spaced legs engaging on their outer faces said radial surfaces, and an inertia member having an inner periphery engaging said annular portion of the rubber body and having radial side faces engaging the inner faces of said radially extending rubber body legs, said inertia member faces and said hub means radial surfaces converging toward each other in a direction of increasing radius.

4. The invention as set forth in claim 3 wherein said radial surfaces on the hub means are inclined toward each other a direction of increasing radius.

5. The invention as set forth in claim 3 wherein the side faces of said inertia member are inclined toward each other in a direction of decreasing radius.

6. The invention as set forth in claim 3 wherein said rubber body is in a state of axial compression.

7. The invention as set forth in claim 3 wherein said annular portion of the rubber body is in a state of radial compression.

8. The invention as set forth in claim 3 wherein said rubber body is in a state of axial compression and the annular portion of the rubber body is in a state of radial compression.

9. The invention as set forth in claim 3 wherein the inner diameter of the annular portion of the rubber body is less than the outer diameter of the annular hub surface on which it is fitted and the diameter of the inner periphery of the inertia member is no greater than the outer diameter of the annular rubber body portion in the free state.

10. A tuned type rubber torsional vibration damper comprising a hub member, an annular inertia disk, a rubber body having an annular portion fitted within the inner periphery of said inertia disk and a radial leg engaging a radial side face of said inertia disk, a clamping member for applying axial compression to said rubber body, a radial flange on one of said members engaging the outer surface of the radial leg of said rubber body whereby said radial leg is confined between said flange and a side face of said inertia disk, one of said members having an annular periphery, the annular portion of said rubber body being mounted on said annular periphery, said radial flange and the radial side of said inertia disk converging toward each other in a direction of increasing radius.

11. The invention as set forth in claim 10 wherein there is an annular recess adjacent one edge of said annular periphery and said rubber body annular portion has a radial lip extending in said recess.

12. A tuned type rubber torsional vibration damper comprising a hub member, an annular inertia disk, a rubber body having an annular portion fitted within the inner periphery of said inertia disk and a radial leg engaging a radial side face of said inertia disk, a clamping member for applying axial compression to said rubber body, a radial flange on said clamping member engaging the outer surface of the radial leg of said rubber body whereby said radial leg is confined between said flange and a side face of said inertia disk, said radial flange being stiff but resilient so that it compensates for set of the rubber body, one of said members having an annular periphery, the annular portion of said rubber body being mounted on said annular periphery, the difference between the radii of said annular periphery and the inner periphery of said inertia disk being less than the thickness of said annular portion of the rubber body when said rubber body is in the free state.

13. A rubber torsional vibration damper comprising a hub adapted to be secured to a shaft subject to torsional vibrations, said hub having a surface extending radially with respect to the axis of a shaft to which it may be secured, an annular inertia member substantially coaxial with said hub and having a radial face spaced axially from the radial surface of said hub, an annular rubber body having radial side faces of substantial radial extent engaging respectively said radial face and radial surface and serving as a yieldable driving connection between said hub and member, said radial side faces and said radial surface and radial face tapering gradually toward each other in a direction of increasing radius so that the rubber body portion defined by said side faces is in the shape of a wedge having its base nearer to the axis of the shaft than its apex whereby radial outward flow of the rubber under centrifugal force is resisted by a reducing cross sectional area of the space between said member face and hub surface.

14. The invention set forth in claim 13 including means forcing the radial surface and radial face toward each other to put said rubber body in a state of axial compression.

References Cited in the file of this patent

UNITED STATES PATENTS

| | | |
|---|---|---|
| 1,925,072 | Griswold | Aug. 29, 1933 |
| 1,925,073 | Gunn | Aug. 29, 1933 |
| 2,380,770 | McFarland | July 31, 1945 |
| 2,473,335 | Hardy | June 14, 1949 |
| 2,526,744 | Hardy | Oct. 24, 1950 |
| 2,556,999 | Hardy | June 12, 1951 |